US012525836B2

(12) United States Patent
Dotz

(10) Patent No.: US 12,525,836 B2
(45) Date of Patent: Jan. 13, 2026

(54) STATOR FOR AN ELECTRIC MACHINE, AND ELECTRIC MACHINE

(71) Applicant: Valeo eAutomotive Germany GmbH, Erlangen (DE)

(72) Inventor: Boris Dotz, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 301 days.

(21) Appl. No.: 18/257,431

(22) PCT Filed: Dec. 17, 2021

(86) PCT No.: PCT/EP2021/086639
§ 371 (c)(1),
(2) Date: Jun. 14, 2023

(87) PCT Pub. No.: WO2022/129603
PCT Pub. Date: Jun. 23, 2022

(65) Prior Publication Data
US 2024/0030768 A1    Jan. 25, 2024

(30) Foreign Application Priority Data
Dec. 17, 2020   (DE) .................... 10 2020 216 151.8

(51) Int. Cl.
*H02K 3/28* (2006.01)
*H02K 1/16* (2006.01)
(Continued)

(52) U.S. Cl.
CPC ................ *H02K 3/28* (2013.01); *H02K 1/16* (2013.01)

(58) Field of Classification Search
CPC .............. H02K 1/16; H02K 3/12; H02K 3/14; H02K 3/04; H02K 3/28; H02K 3/46; H02K 3/48;
(Continued)

(56) References Cited

U.S. PATENT DOCUMENTS 10,998,788 B2 *   5/2021   Neet ........................ H02K 3/12
11,489,388 B2 *  11/2022   Dotz ........................ H02K 3/28
(Continued)

FOREIGN PATENT DOCUMENTS

DE         603 11 045 T2      10/2007
DE     10 2012 108 943 A1       3/2013
(Continued)

OTHER PUBLICATIONS

Translation of Written Opinion of the International Searching Authority for PCT/EP2021/086639 (Year: 2022).*
(Continued)

*Primary Examiner* — Edgardo San Martin
(74) *Attorney, Agent, or Firm* — Oblon, McClelland, Maier & Neustadt, L.L.P.

(57) ABSTRACT

Stator for an electric machine has a number $N \geq 3$ of phases, a number $P \geq 2$ of pole pairs and a hole count $q=2$, and a stator core, which has two faces and a plurality of slots which are divided into first to L-th layers, where $L \geq 4$. The shaped conductors form for each phase first to fourth paths and are arranged in $2 \cdot P$ winding zones, and each winding zone is divided into a first and a second sub-winding zone and each sub-winding zone extends over the L layers. The shaped conductors of a respective path are interconnected by connectors, which connect shaped conductors in adjacent winding zones of the same phase in an alternating manner at the first face and the second face of the stator core, to form a series connection with a first end shaped conductor.

20 Claims, 10 Drawing Sheets

(51) Int. Cl.
*H02K 3/48* (2006.01)
*H02K 3/52* (2006.01)
*H02K 15/064* (2025.01)

(58) Field of Classification Search
CPC ............ H02K 3/50; H02K 3/52; H02K 3/521; H02K 3/5225; H02K 15/00; H02K 15/064; H02K 15/0643; H02K 15/062
See application file for complete search history.

(56) References Cited

U.S. PATENT DOCUMENTS

| | | | | |
|---|---|---|---|---|
| 11,489,389 | B2 * | 11/2022 | Dotz | H02K 3/12 |
| 11,863,035 | B2 * | 1/2024 | Eilenberger | H02K 3/28 |
| 11,949,305 | B2 * | 4/2024 | Ahmed | H02K 3/28 |
| 12,132,369 | B2 * | 10/2024 | Neet | H02K 3/28 |
| 12,191,729 | B2 * | 1/2025 | Dotz | H02K 15/064 |
| 12,328,047 | B2 * | 6/2025 | Dotz | H02K 3/28 |
| 2012/0161569 | A1 * | 6/2012 | Hisada | H02K 3/28 310/201 |
| 2013/0076188 | A1 | 3/2013 | Ikeda et al. | |
| 2013/0113330 | A1 * | 5/2013 | Saito | H02K 21/14 310/207 |
| 2020/0014267 | A1 | 1/2020 | Rahman et al. | |
| 2020/0280231 | A1 | 9/2020 | Koga | |
| 2021/0296956 | A1 | 9/2021 | Eilenberger | |
| 2022/0190666 | A1 * | 6/2022 | Neet | H02K 15/0433 |
| 2023/0307975 | A1 * | 9/2023 | Dotz | H02K 3/12 |
| 2023/0421010 | A1 * | 12/2023 | Dotz | H02K 1/16 |
| 2024/0030769 | A1 * | 1/2024 | Dotz | H02K 3/12 |

FOREIGN PATENT DOCUMENTS

| | | | | |
|---|---|---|---|---|
| DE | 10 2017 218 202 A1 | 4/2019 | | |
| JP | 4450124 B2 * | 4/2010 | | H02K 3/12 |
| JP | 2014217136 A * | 11/2014 | | H02K 3/28 |
| WO | WO 2020/047568 A1 | 3/2020 | | |

OTHER PUBLICATIONS

Germanic Office Action issued Feb. 7, 2025 in Germanic Patent Application No. 102020216151.8 (with English translation of Category of Cited Documents), 12 pages.

International Search Report Issued on Apr. 21, 2022 in PCT/EP2021/086639 filed on Dec. 17, 2021, 2 pages.

* cited by examiner

STATOR FOR AN ELECTRIC MACHINE, AND ELECTRIC MACHINE

BACKGROUND OF THE INVENTION

The present invention relates to a stator for an electric machine. In addition, the invention relates to an electric machine for driving a vehicle.

Stators with a stator winding formed from shaped conductors are extremely popular particularly in automotive applications since stators of this kind are particularly suitable for automated manufacture with a high degree of process reliability and simple connection options for the phases. Stators with two paths interconnected or interconnectable in parallel for each phase are known.

For example, DE 10 2012 108 943 A1 discloses a stator of an electric machine, which stator contains a stator core and a stator winding. The stator core has a number of slots, which are arranged in a circumferential direction of the stator core. The stator winding consists of a number of phase windings, each of which is wound onto the stator core such that said phase winding is inserted into the corresponding slots of the stator core. The stator core has, for each of the phase windings of the stator winding, n circumferentially successive single-phase slots in which only the phase winding is accommodated, where n is a natural number greater than or equal to 2. Each of the phase windings of the stator winding has k sections, which contain a first section and a k-th section, where k is a natural number greater than or equal to 2. The first to k-th sections are arranged in order from one end to the other end of the phase winding. Each of the phase windings of the stator winding consists of j sub-windings, which are connected in parallel with one another between opposite ends of the phase winding, where j is a natural number greater than or equal to 2 and each of the sub-windings contains k sections. Each of the phase windings of the stator winding consists of a plurality of electrical conductor segments which are inserted into the single-phase slots for the phase winding and are connected electrically in series with one another, wherein each corresponding pair of sections, located in the slot, of the electrical conductor segments are connected on one axial side of the stator core and each corresponding pair of end parts of the electrical conductor segments are connected to one another on the other axial side of the stator core.

SUMMARY OF THE INVENTION

The invention is therefore based on the object of specifying a stator for an electric machine, which is improved in comparison to the stator described above.

According to the invention, this object is achieved by a stator for an electric machine, wherein the stator has a number $N \geq 3$ of phases, a number $P \geq 2$ of pole pairs and a hole count $q=2$, wherein the stator comprises a stator core, which has a first face, a second face situated opposite the first face and a plurality of slots which extend from the first face to the second face and are divided into first to L-th layers, where $L \geq 4$, and a plurality of shaped conductors which are arranged in the slots in a radially layered manner in the first to L-th layer, wherein the layers are designated in their order in the radial direction, wherein the shaped conductors form for each phase a first path, a second path, a third path and a fourth path and are arranged in 2·P winding zones, wherein each winding zone is divided into a first and a second sub-winding zone, each sub-winding zone extends over the L layers and the sub-winding zones of a respective winding zone are designated in their order along a first circumferential direction and a second circumferential direction opposite to the first circumferential direction, wherein the shaped conductors of a respective path are interconnected by connectors, which connect shaped conductors in adjacent winding zones of the same phase in an alternating manner at the first face and the second face of the stator core, to form a series connection with a first end shaped conductor, which is one of the outer shaped conductors, in terms of the series connection, of the path and with a second end shaped conductor, which is the other of the outer shaped conductors, in terms of the series connection, of the path, wherein the end shaped conductors of each path are arranged in different sub-winding zones, so that the path exhibits a change in the sub-winding zones along the series connection.

The stator for an electric machine has a number $N \geq 3$ of phases. The stator further has a number $P \geq 2$ of pole pairs. The stator further has a hole count $q=2$. The stator comprises a stator core. The stator core has a first face. The stator core has a second face. The second face is situated opposite the first face. The stator core further has a plurality of slots. The slots extend from the first face to the second face. The slots are further divided into first to L-th layers, where $L \geq 4$. The stator further comprises a plurality of shaped conductors. The shaped conductors are arranged in the slots in a radially layered manner in the first to L-th layer. The layers are designated in their order in the radial direction. The shaped conductors form for each phase a first path, a second path, a third path and a fourth path. The shaped conductors are arranged in 2·P winding zones for each phase. Each winding zone is divided into a first and a second sub-winding zone. Each sub-winding zone extends over the L layers. The sub-winding zones of a respective winding zone are designated in their order along a first circumferential direction and a second circumferential direction. The second circumferential direction is opposite to the first circumferential direction. The shaped conductors of a respective path are interconnected by connectors to form a series connection. The connectors connect shaped conductors in adjacent winding zones of the same phase in an alternating manner at the first face and the second face of the stator core. The series connection has a first end shaped conductor. The first end shaped conductor is one of the outer shaped conductors, in terms of the series connection, of the path. The series connection further has a second end shaped conductor. The second end shaped conductor is the other of the outer shaped conductors, in terms of the series connection, of the path. The end shaped conductors of each path are arranged in different sub-winding zones, so that the path exhibits a change in the sub-winding zones along the series connection.

The stator according to the invention is distinguished, in particular, in that the end shaped conductors of a respective path are arranged in different sub-winding zones. Therefore, each path is distributed over the two sub-winding zones, as a result of which requirements in respect of symmetry made of a stator winding comprising the paths can already be met for each path. This allows a high degree of flexibility in terms of the selection of the winding pattern for the stator winding since, when the requirements in respect of symmetry are met by a respective path, the requirements in respect of symmetry can also be met when the paths are interconnected, for example when in each case two of the paths are connected in series or when the four paths are connected in parallel.

The hole count q is the number of slots per pole and phase of the stator. In the stator according to the invention, N can be ≤12, preferably N can be ≤9, particularly preferably N can be ≤6. P might be ≤20, preferably P might be ≤16, particularly preferably P might be ≤12. The number of slots is preferably less than 200, particularly preferably less than 120. The number of slots can be precisely 2·P·N·q. Precisely 2·P·N·q·L shaped conductors can be provided. Each winding zone preferably implements one pole of the stator.

A "path" is intended to be understood as a series connection of shaped conductors realized by the connectors, which series connection can also be referred to as a "current path". The numbers of shaped conductors of a respective path accommodated in the first sub-winding zone and in the second sub-winding zone are preferably the same. In other words, half of the shaped conductors of a respective path can be arranged in the first sub-winding zone and the other half of the shaped conductors of the respective path can be arranged in the second sub-winding zone. Each path typically comprises precisely 4·P shaped conductors.

Precisely one winding zone of the other phases is expediently located between each pair of the adjacent winding zones of a phase in each case. In other words, each pair of adjacent winding zones of a phase is spaced apart by q·(N−1) slots. The stator is preferably designed in such a way that current flows through the winding zones of a respective phase in a direction of flow which is opposite to the direction of flow of a directly adjacent winding zone of the same phase.

In a preferred embodiment, it may be intended for precisely four shaped conductors to be received in each slot and/or for N to be precisely 3 and/or for P to be precisely 2, 4, 6 or 8 and/or for q to be precisely 2. The first layer is preferably the radially outermost layer and/or the fourth layer is preferably the radially innermost layer. However, it is also conceivable for the first layer to be the radially innermost layer and/or the fourth layer to be the radially outermost layer.

The shaped conductors can be rod-like conductors, in particular composed of copper. The shaped conductors are typically not limp. Four shaped conductors in the four layers and/or in the entire slot preferably take up at least 60%, preferably at least 80%, of the cross-sectional area of a slot. The shaped conductors preferably have a, possibly also rounded, rectangular cross section. Each shaped conductor can extend through one of the slots completely in the axial direction.

The stator core can be formed by a large number of permanently connected individual laminations layered with each other. In particular, the stator core forms a laminated core. The slots are formed, in particular, as recesses in the stator core, which extend in the axial direction. Each slot preferably extends parallel to a centre axis along which a receiving space, surrounded by the stator core, for a rotor extends. Furthermore, a slot opening, which connects the slot to the receiving space, can be formed for each slot in the stator core.

The first circumferential direction and the second circumferential direction can also be regarded as opposite orientations or directions of rotation to a direction perpendicular to the axial direction and radial direction in cylinder coordinates. The first circumferential direction preferably corresponds to the clockwise direction, as seen from the first face. As an alternative, the first circumferential direction can also correspond to the anticlockwise direction.

In a preferred embodiment, it may be intended for two of the paths, in particular the first path and the third path, might be foreseen to extend from their first end shaped conductor to their second end shaped conductor along the first circumferential direction and two of the paths, in particular the second path and the fourth path, to extend from their first end shaped conductor to their second end shaped conductor along the second circumferential direction. As a result, good symmetry can also be achieved in respect of the winding direction of the stator winding.

It is preferred that the first end shaped conductor and the shaped conductors following it in terms of the series connection are located in the same sub-winding zone up to the change in the sub-winding zones and that the shaped conductors are located in the same sub-winding zone starting from the change in the sub-winding zones up to the second end shaped conductor. As a result, the distribution of the shaped conductors of a respective path over the sub-winding zones can be achieved with a single change in the sub-winding zones.

Each path preferably occupies each winding zone of the phase at least once. As a result, each path can form a complete turn around the stator in the circumferential direction.

It may further be foreseen that, in two of the paths, the first end shaped conductor and the shaped conductors following it in terms of the series connection occupy P winding zones up to the change in the sub-winding zones and the shaped conductors following in terms of the series connection occupy P winding zones from the change in the sub-winding zones up to the second end shaped conductor.

As an alternative or in addition, for two of the paths, it can be foreseen that the first end shaped conductor and the shaped conductors following it in terms of the series connection occupy P+2 winding zones up to the change in the sub-winding zones and the successive shaped conductors in terms of the series connection occupy P+2 winding zones from the change in the sub-winding zones up to the second end shaped conductor, so that the first end shaped conductor and the shaped conductors following it in terms of the series connection overlap in four winding zones up to the change in the sub-winding zones and the successive shaped conductors in terms of the series connection overlap in four winding zones from the change in the sub-winding zones up to the second end shaped conductor.

A further improvement to the symmetry properties can be achieved by way of the first end shaped conductors of two of the paths, in particular the first path and the second path, being located in the same sub-winding zone, which is different from the sub-winding zone in which the first end shaped conductors of the other two of the paths are located.

A respective phase can have a first end and a second end. It is then preferred for the first end shaped conductor of the first path to form the first end of the phase and the second end shaped conductor of the fourth path to form the second end of the phase.

A first preferred embodiment is described below, in which in each case two paths can be connected in series:

In the first preferred embodiment, for the first end shaped conductor of the third path to form the first end of the phase and the second end shaped conductor of the second path forms the second end of the phase. It is further possible for the second end shaped conductor of the first path and the first end shaped conductor of the second path to be electrically conductive connected, in particular by means of one of the connectors, so that the first path and the second path are connected in series. As an alternative or in addition, the second end shaped conductor of the third path and the first end shaped conductor of the fourth path can be intended to be electrically conductive connected, in particular by means of one of the connectors, so that the third path and the fourth path are connected in series.

A second preferred embodiment is described below, in which in each case two paths can be connected in series:

In the second preferred embodiment, it may be further intended for the first end shaped conductor of the second path to form the first end of the phase and the second end shaped conductor of the third path to form the second end of the phase. It is further possible for the second end shaped conductor of the first path and the first end shaped conductor of the third path to be electrically conductive connected, in particular by means of one of the connectors, so that the first path and the third path are connected in series. As an alternative or in addition, it may be intended for the second end shaped conductor of the second path and the first end shaped conductor of the fourth path to be electrically conductive connected, in particular by means of one of the connectors, so that the second path and the fourth path are connected in series.

According to a third preferred embodiment in which the four paths are connected in parallel, it may be intended for the first end shaped conductors of the paths to form the first end of the phase and the second end shaped conductors of the paths to form the second end of the phase.

In a preferred embodiment, the stator further has a connection device with phase connections which each contact the first end of one of the phases and/or with a star point connector, which connects the second ends of the phases to form one, two or four star points. That is to say, the second ends of all phases are connected together to form a star point. One star point is created. However, as an alternative, in each case two of the second ends of the phases can also be connected to in each case two of the second ends of the two other phases to form a star point. Therefore, six second ends are connected to form a star point. As a result, two star points are created. In addition, as a third alternative, only in each case one of the second ends of a respective phase can also be connected to in each case one of the second ends of the other two phases to form a star point. Therefore, three second ends are connected to form a star point. Therefore, four star points are created.

A connection element preferably adjoins the end shaped conductors, which form one end of a phase at the first face and a connecting element of a connector of the second type preferably adjoins the end shaped conductors, which form one end of a phase at the second face. Such an arrangement can also be referred to as an I-pin. The connection element preferably extends further in the axial direction than the connectors of the first type. The connection elements are preferably contacted by the connection device.

In general, it is preferred that each path forms a combined lap and wave winding.

In the stator according to the invention, two of the paths, in particular the first path and the third path, each comprise at least two groups of the first type, in particular first to P-th groups of the first type designated in their order in terms of the series connection, of four successive shaped conductors, in terms of the series connection, which are designated in their order in terms of the series connection.

In this case, it may be intended for a first shaped conductor of a respective one of the groups of the first type to be arranged in the first layer of one of the winding zones, a second shaped conductor of a respective one of the groups of the first type is arranged in the second layer of a winding zone adjacent, along one of the circumferential directions, to the winding zone in which the first shaped conductor is arranged, a third shaped conductor of a respective one of the groups of the first type is arranged in the fourth layer of the winding zone in which the first shaped conductor is arranged, and a fourth shaped conductor of a respective one of the groups of the first type is arranged in the third layer of the winding zone in which the second shaped conductor is arranged. The one circumferential direction is preferably the first circumferential direction. A respective group of the first type can therefore form, in particular, a lap component of the combined lap and wave winding.

The first shaped conductor of such groups of the first type, which follow another group of the first type in terms of the series connection, is preferably arranged in one of the winding zones, which follows, along the one circumferential direction, the winding zone in which the fourth shaped conductor of the other group of the first type is arranged. Therefore, in particular, a wave component, advancing along the circumferential direction, of the combined lap and wave winding can be formed.

Additionally, it may be intended for two of the groups of the first type, in particular the (P/2)-th group of the first type and the [(P/2)+1-th] group of the first type, to be electrically conductive connected by one of the connectors and the change in the sub-winding zones to be performed by the connector.

Furthermore, the first end shaped conductor of a respective one of the two paths can be the first shaped conductor of one of the groups of the first type, in particular the first groups of the first type, and the second end shaped conductor of a respective one of the two paths can be the fourth shaped conductor of another of the groups of the first type, in particular the P-th group of the first type.

In the stator according to the invention, two of the paths, in particular the second path and the fourth path, each comprise at least two groups of the second type, in particular first to P-th groups of the second type designated in their order in terms of the series connection, of four successive shaped conductors, in terms of the series connection, which are designated in their order in terms of the series connection.

In this case, it may be intended for a first shaped conductor of a respective one of the groups of the second type to be arranged in the second layer of one of the winding zones, a second shaped conductor of a respective one of the groups of the second type to be arranged in the first layer of a winding zone adjacent, along one of the circumferential directions, to the winding zone in which the first shaped conductor is arranged, a third shaped conductor of a respective one of the groups of the second type to be arranged in the third layer of a winding zone adjacent, along the one circumferential direction, to the winding zone in which the second shaped conductor is arranged, and a fourth shaped conductor of a respective one of the groups of the second type is arranged in the fourth layer of a winding zone adjacent, along the one circumferential direction, to the winding zone in which the third shaped conductor is arranged. The one circumferential direction is preferably the second circumferential direction. The groups of the second type therefore form, in particular in part, a wave component, advancing along the circumferential direction, of the combined lap and wave winding.

The first shaped conductor of a group of the second type, which follows another group of the second type of the second section in terms of the series connection, is preferably arranged in the winding zone in which the third shaped conductor of the other group of the second type is arranged.

Therefore, in particular, a lap component of the combined lap and wave winding can be formed.

Additionally, it may be intended for two of the groups of the second type, in particular the (P/2)-th group of the second type and the [(P/2)+1-th] group of the second type, to be electrically conductive connected by one of the connectors and the change in the sub-winding zones to be performed by the connector.

Furthermore, the first end shaped conductor of a respective one of the two paths can be the first shaped conductor of one of the groups of the second type, in particular the first group of the second type, and the second end shaped conductor of a respective one of the two paths can be the fourth shaped conductor of another of the groups of the second type, in particular the P-th group of the second type.

In the stator according to the invention, it may also be intended for the connectors to be alternately formed as connectors of the first type, which are arranged at a first face of the stator core, and as connectors of the second type, which are arranged at the second face of the stator core. In this case, the first and second end shaped conductors of a respective path are preferably connected to the adjacent shaped conductor in terms of the series connection by connectors of the second type. In particular, the end shaped conductors can therefore be contacted or connected at the first face, on which the connectors of the first type are also located.

In a preferred embodiment, it may be intended here for the connectors of the first type to be formed in one piece with the shaped conductors connected by them and to extend away from the stator core at the first face. The connectors of the first type and the shaped conductors connected by them are preferably formed from an electrically conductive rod, wherein the connector of the first type is formed, in particular, by bending the rod.

As an alternative or in addition, it may be intended for the connectors of the second type to comprise two connecting elements which adjoin the shaped conductors, connected by the connector of the second type, at the second face in a manner extending away from the stator core and for them to be electrically conductive connected to each other, in particular in a materially bonded manner. The shaped conductors and the connecting elements adjoining them can also be formed from the or an electrically conductive rod. The connecting elements can be formed by bending the rod. In particular, the bar is bent after being inserted into the stator core.

A respective first connector, the shaped conductors connected by it and the connecting elements, adjoining the shaped conductors, of two second connectors can consequently form a one-piece conductor segment, which can also be referred to as a hairpin conductor or U-pin.

It is further preferred that the connectors of the first type are arranged in an imbricated manner. Owing to such an arrangement, also referred to as U-and-U imbrication, the installation space at the faces can be efficiently utilized and a small winding overhang, that is to say a reduced axial extent of the connectors beyond the face, can be implemented.

It is further advantageous when, from amongst the connectors of the first type, forming the change between the sub-winding zones, of in each case two paths, one of the connectors of the first type is arranged axially within the other connector of the first type. In particular, that connector of the first type, which implements a small offset over several slots, is arranged axially on the inside. Owing to such a topology—also called a U-inside-U topology—a small winding overhang can be implemented.

In the stator according to the invention, it may be intended for all connectors which connect shaped conductors located in the same sub-winding zone to implement an offset by N·q slots.

That connector by way of which the change between the sub-winding zones is made preferably implements an offset by N·q+1 or N·q−1 slots. The connectors, by way of the change between the sub-winding zones is made, of the first path and the second path preferably implement an offset by N·q−1 slots and the connectors, by way of which the change between the sub-winding zones is made, of the third path and the fourth path preferably implement an offset by N·q+1 slots.

The connectors which connect two of the paths in series can implement an offset by N·q+1 or N·q−1 slots. The connector which connects the first path and the second path in series preferably implements an offset by N·q+1 and/or the connector which connects the third path and the fourth path in series preferably implements an offset by N·q−1 slots.

As an alternative, the connectors which connect two of the paths in series can implement an offset by N·q slots. The connector which connects the first path and the third path in series and/or the connector which connects the second path and the fourth path in series preferably implement/implements an offset by N·q slots.

The object on which the invention is based is further achieved by an electric machine for driving a vehicle, comprising a stator according to one of the preceding claims and a rotor rotatably mounted within the stator. The electric machine is preferably an electric motor. The electric machine can be, for example, a synchronous machine with permanent excitation or a synchronous motor with permanent excitation or an asynchronous machine/induction machine or an asynchronous motor.

BRIEF DESCRIPTION OF THE DRAWINGS

Further advantages and details of the present invention can be gathered from the exemplary embodiments described below and based on the drawings. The drawings are schematic illustrations in which:

FIG. 3 shows a winding diagram according to the first exemplary embodiment;

FIG. 7 shows a winding diagram according to the second exemplary embodiment;

DETAILED DESCRIPTION OF THE INVENTION

Figure 1:
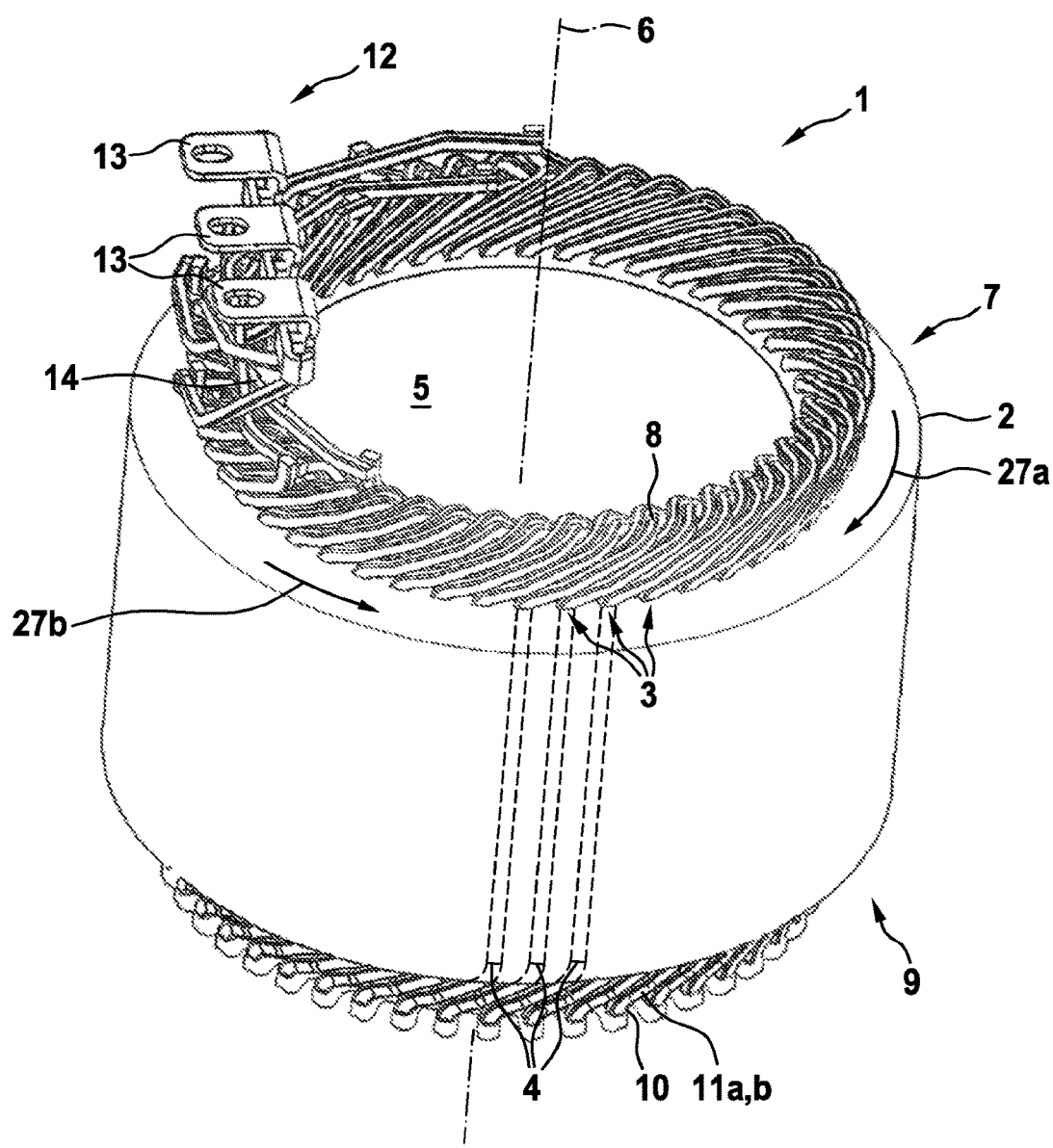
FIG. 1 shows a basic diagram of a stator.

FIG. 1 is a basic diagram of a stator 1.

The stator 1 has a stator core 2, which has a plurality of substantially axial slots 3, which are arranged in the stator core 3 along a first circumferential direction 27a or a second circumferential direction 27b opposite to the first circumferential direction. In addition, the stator 1 has a large number of shaped conductors 4, which are arranged in the slots 3 in a layered manner. The shaped conductors 4 extend through the slots 3 completely in the axial direction, that is to say parallel to a centre axis 6 passing through a receiving space 5 for a rotor. The slots 3 likewise extend parallel to the centre axis 6. The slots 3 are formed as recesses in the stator core 2 and connected to the receiving space 5 through slot openings in the stator core 2.

At a first face 7 of the stator 1, the shaped conductors 4 are connected in pairs by connectors of the first type 8. The connectors of the first type 8 are formed in one piece with the pair of shaped conductors 4 here and create a bend through 180°. At a second face 9 of the stator 1, the pair of shaped conductors 4 are connected to another pair of shaped conductors 4 by connectors of the second type 10. A respective connector of the second type 10 comprises two bent connecting elements 11a, 11b which adjoin the connected shaped conductors 4 in one piece and are connected to connecting elements 11a, 11b of other connectors of the second type 10. Here, the connection is formed in a materially bonded manner, in particular by welding. The shaped conductors 4 and the connectors 8, 10 form a stator winding of the stator 1.

FIG. 1 further shows a connection device 12, which has phase connections 13 and one or more star point connectors 14.

Figure 2:
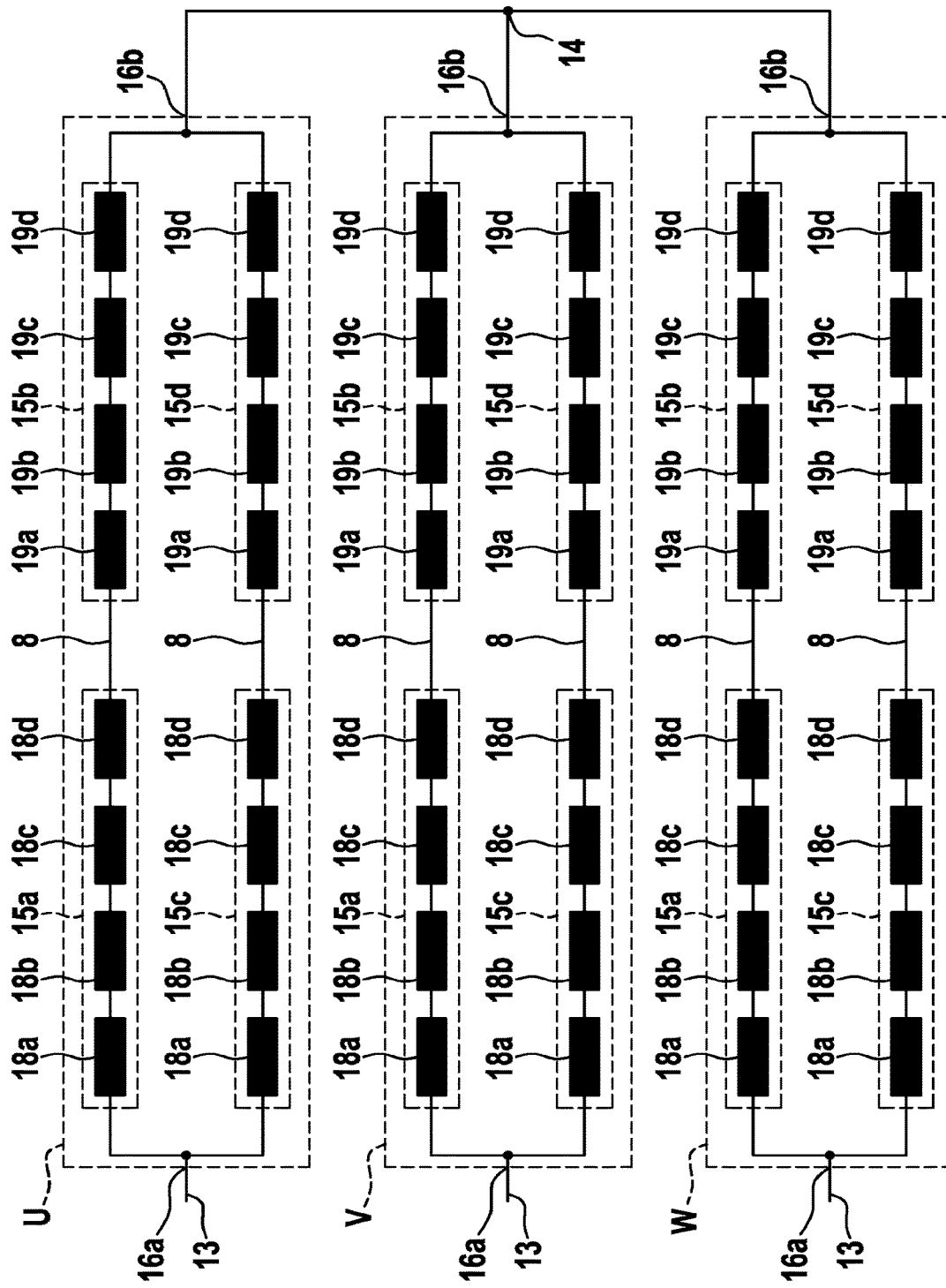
FIG. 2 shows a block circuit diagram of the stator winding of a first exemplary embodiment of the stator according to the invention.

FIG. 2 shows a block circuit diagram of a stator winding according to a first exemplary embodiment of a stator 1, to which the statements made in relation to the stator 1 shown in FIG. 1 can be applied.

The stator 1 according to the first exemplary embodiment has, in the exemplary configuration shown, N=3 phases U, V, W and P=4 pole pairs and also a hole count q=2. The shaped conductors 4 form a first path 15a, a second path 15b, a third path 15c and a fourth path 15d for each phase U, V, W. In each case two paths 15a-d of a respective phase U, V, W are connected in series by a connector of the first type 8. The phase connections 13 contact a first end 16a of a respective phase U, V, W. The star point connector 14 contacts the second ends 16b of the phases U, V, W. The shaped conductors 4 of a respective path 15a-d are connected in series.

For each of the phases U, V, W, the shaped conductors 4 of the first path 15a and the third path 15c form first to fourth (P-th) groups of the first type 18a-d of shaped conductors 4 connected in series and the shaped conductors 4 of the second path 15b and the fourth path 15d form first to fourth (P-th) groups of the second type 19a-d. Here, the groups of the first and second type 18a-d, 19a-d are also designated in their respective order in terms of the series connection, here counted from the phase connection 13 to the star point 14.

In the present exemplary embodiment, the first path 15a and the second path 15b are connected in series. Furthermore, the third path 15c and the fourth path 15d are connected in series.

Figure 3:
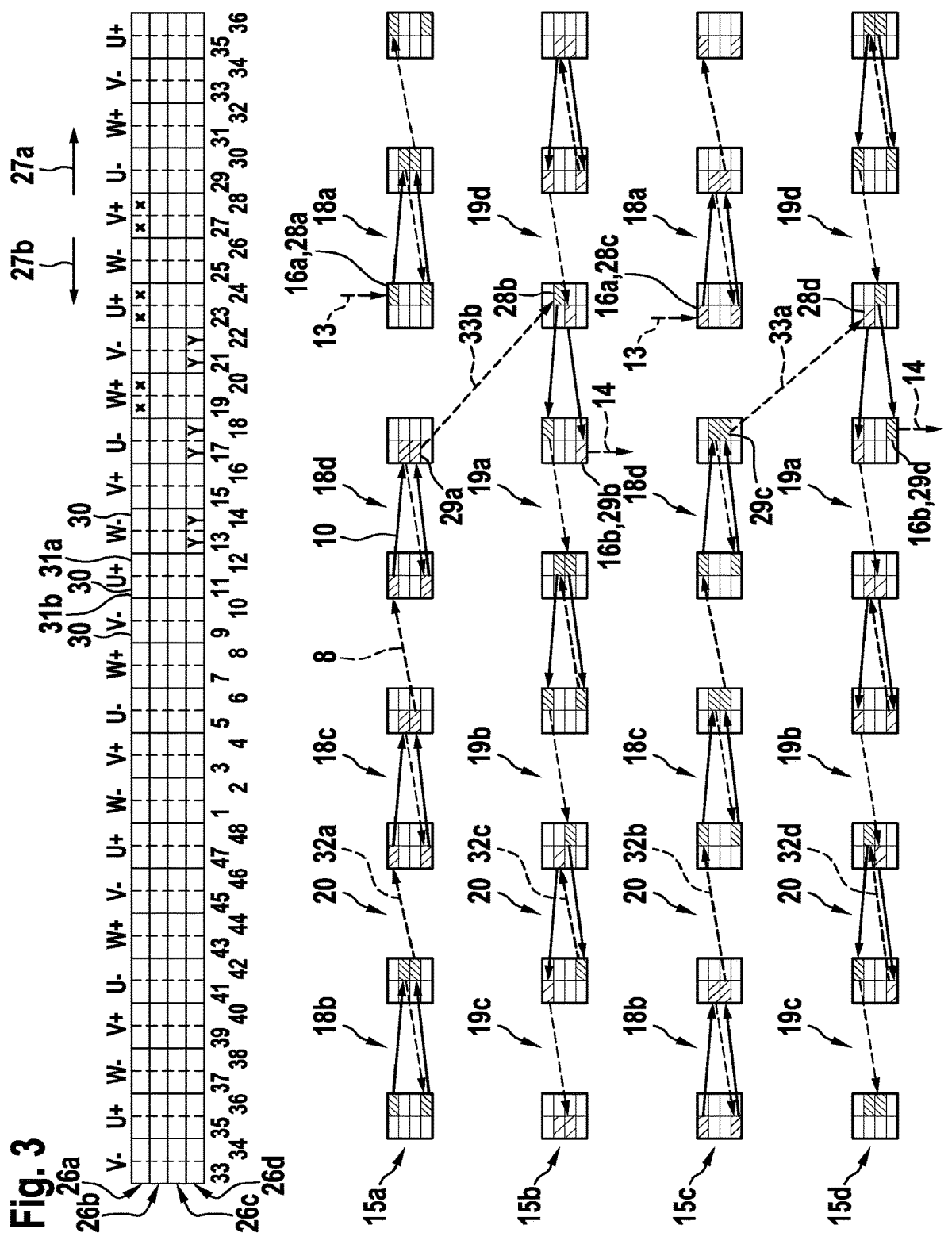

FIG. 3 shows a winding diagram of the stator winding according to the first exemplary embodiment.

The stator 1 has a hole count q=2. In the present case, this results in a total number of 2·P·N·q=48 slots 3. The hole count q therefore describes the ratio of the number of slots 3 to the product of the number of poles 2·P and the number of phases N.

Here, the shaped conductors 4 are arranged in a first layer 26a, a second layer 26b, a third layer 26c and a fourth layer 26d, wherein the layers 26a-d are designated in accordance with their order from radially on the outside to radially on the inside. The first layer 26a is the radially outermost layer and the fourth layer 26d is the radially innermost layer of the four layers 26a-d. Precisely one shaped conductor 4 is arranged in each layer 26a-d of a respective slot 3. In other words, each layer 26a-d of a respective slot 3 forms a receiving space for precisely one shaped conductor 4. This results in a number of, in total, 2·P·N·q·L=192 receiving spaces or shaped conductors 4 of the stator 1, where L describes the number of layers 26a-d.

FIG. 3 shows, using two arrows arranged above the upper table, the first circumferential direction 27a, which corresponds to the clockwise direction as seen from the first face 7 of the stator 1, and the second circumferential direction 27b, which corresponds to the anti-clockwise direction as viewed from the first face 7 of the stator 1, (also see FIG. 1). FIG. 3 further shows slot numbering from 1 to 48 below the upper table. The upper table in FIG. 3 shows which phase U, V, W a shaped conductor 4 arranged in a respective receiving space belongs to, where the addition of a "+" or "−" denotes a polarity of an electric current through the shaped conductor 4 in question.

Each path 15a-d has a first end shaped conductor 28a-d and a second end shaped conductor 29a-d, which are the outer shaped conductors 4 of the path 15a-d in terms of the series connection. In the present exemplary embodiment, the first end shaped conductors 28a, 28c of the first path 15a and the third path 15c form the first end 16a of a respective phase U, V, W. The second end shaped conductors 29b, 29d of the second path 15b and the fourth path 15d form the second end 16b of a respective phase U, V, W.

Furthermore, receiving spaces for the first end shaped conductors 28a, 28c forming the first end 16a of a respective phase U, V, W are identified by an "X" in the upper table. The first end shaped conductors 28a, 28c are connected to the phase connection 13. In addition, receiving spaces for the second end shaped conductors 29b, 29d forming the second end 16b of a respective phase U, V, W are identified by a "Y". The second end shaped conductors 29b, 29d are connected to the star point connector 14.

It is clear that the shaped conductors of each phase U, V, W are arranged in 2·P=8 winding zones 30 which each comprise precisely q·L=8 receiving spaces. Each winding zone 30 is divided into q=2 sub-winding zones 31a, 31b. In each winding zone 30, the first sub-winding zone 31a follows the second sub-winding zone 31b along the first circumferential direction 27a. Each sub-winding zone 31a, 31b extends over all four layers 26a-d. In the present exemplary embodiment, each sub-winding zone 31a, 31b lies in precisely one slot 3 by way of example.

Between the receiving spaces of the shaped conductors 4, the connectors of the first type 8 are identified by dashed arrows and the connectors of the second type 10 are identified by solid arrows. The shaped conductors of a respective path 15a-d form a combined lap and wave winding. Here, the illustration of the shaped conductors 4 and the connectors 8, 10 for the phase U is representative of the other phases V, W in which the arrangement of the shaped conductors 4 and connectors 8, 10, apart from a shift by q=2 slots 3, corresponds to that of the phase U.

In the text, which follows, the structure of the stator winding is explained based on the phase U:

The end shaped conductors 28a-d, 29a-d of each path 15a-d are arranged in different sub-winding zones 31a, 31b, so that the path 15a-d exhibits a change 20 in the sub-winding zones 31a, 31b. The first end shaped conductors 28a, 28b of the first and second paths 15a, 15b are arranged in the first sub-winding zone 31a. The first end shaped conductors 28c, 28d of the third and fourth paths 15c, 15d are arranged in the second sub-winding zone 31b. Accordingly, the second end shaped conductors 29a, 29b of the first and second paths 15a, 15b are arranged in the second sub-winding zone 31b and the second end shaped conductors 29c, 29d of the third and fourth paths 15c, 15d are arranged in the first sub-winding zone 31a, 31b.

Specifically, the shaped conductors 4 of the first and second [(P/2)-th] groups of the first type 18a, 18b of the first path 15a on the one hand and the third path 15c on the other are arranged in different sub-winding zones 31a, 31b. The shaped conductors 4 of the third [(P/2+1)-th] and fourth (P-th) groups of the first type 18c, 18d of the first path 15a on the one hand and the third path 15c on the other are likewise arranged in different sub-winding zones 31a, 31b. Furthermore, the shaped conductors 4 of the first and second [(P/2)-th] groups of the second type 19a, 19b of the second path 15b on the one hand and the fourth path 15d on the other are arranged in different sub-winding zones 31a, 31b. The shaped conductors 4 of the third [(P/2+1)-th] and fourth (P-th) groups of the second type 19c, 19d of the second path 15b on the one hand and the fourth path 15d on the other are likewise arranged in different sub-winding zones 31a, 31b. Here, the first groups of the first and second type 18a, 19a each comprise the first end shaped conductor 28a-d and the fourth (P-th) groups of the first and second type 18a, 19d each comprise the second end shaped conductor 29-d.

The change 20 in the sub-winding zones 31a, 31b is made between the second [(P/2)-th] and the third [(P/2+1)-th] group of the first type 18b, 18c of the first and third paths 15a, 15c and between the second [(P/2)-th] and the third [(P/2+1)-th] group of the second type 19a, 19c of the second and fourth paths 15b, 15d. Connectors separately denoted by 32a-d and formed here as connectors of the first type 8 are provided for this purpose. The connector 32a connects the second [(P/2)-th] and the third [(P/2)+1-th] group of the first type 18b, 18c of the first path 15a in series. The connector 32b connects the second [(P/2)-th] and the third [(P/2)+1-th] group of the first type 18b, 18c of the third path 15c in series. The connector 32c connects the second [(P/2)-th] and the third [(P/2)+1-th] group of the second type 19b, 19c of the second path 15c in series. The connector 32d connects the second [(P/2)-th] and the third [(P/2)+1-th] group of the second type 19b, 19c of the fourth path 15d in series.

The connector 32a, which connects the second ([P/2-th] and the third [(P/2)+1-th] group of the first type 18b, 18c of the first path 15a in series, and the connector 32c, which connects the second [P/2-th] and the third [(P/2)+1-th] group of the second type 19b, 19c of the second path 15b in series, each implement an offset by q·N−1=5 slots 3. The connector 32b, which connects the second ([P/2-th] and the third [(P/2)+1-th] group of the first type 18b, 18c of the third path 15c in series, and the connector 32d, which connects the second [P/2]-th] and the third [(P/2)+1-th] group of the second type 19b, 19c of the fourth path 15d in series, each implement an offset by q·N+1=7 slots 3. The other connectors, which connect groups of the first type 18a-d of the first and third paths 15a, 15c and groups of the second type 19a-d of the second and fourth paths 15b, 15d in series, each implement an offset by q·N=6 slots 3.

Each path 15a-d executes substantially a complete turn around the stator core 2. The first and third paths 15a, 15c each occupy 2·P=8 directly successive winding zones here. From the first end shaped conductor 28a, 28c up to the change 20 in the sub-winding zones 31a, 31b, the first and third paths 15a, 15c each occupy P=4 directly successive winding zones 30. From the change 20 in the sub-winding zones 31a, 31b up to the second end shaped conductor 29a, 29c, the first and third paths 15a, 15b each likewise occupy P=4 directly successive winding zones 30. The second and fourth paths 15b, 15d occupy (2·P)+2=10 directly successive winding zones since a respective path 15b, 15d overlaps in two winding zones 30. From the first end shaped conductor 28b, 28d up to the change 20 in the sub-winding zones 31a, 31b, the second and fourth paths 15b, 15d each occupy P+2=6 directly successive winding zones 30. From the change 20 in the sub-winding zones 31a, 31b up to the second end shaped conductor 29b, 29d, the second and fourth paths 15b, 15d each likewise occupy P+2=6 directly successive winding zones 30 since the groups of the second type 19a-d overlap at the change 20 in the sub-winding zones 31a, 31b and in the case of the end shaped conductors 28b, 29b, 28d, 29d.

It is further clear from FIG. 3 that the first and third paths 15a, 15c extend around the stator core 2 along the first circumferential direction 27a, while the second and fourth paths 15b, 15d extend around the stator core 2 along the second circumferential direction 27b.

According to the present exemplary embodiment, the second end shaped conductor 29a of the first path 15a and the first end shaped conductor 28b of the second path 15b are connected in series. Accordingly, the fourth (P-th) group of the first type 18d of the first path 15a and the first group of the second type 19a of the second path 15b are connected in series. Furthermore, the second end shaped conductor 29c of the third path 15c and the first end shaped conductor 28d of the fourth path 15d are connected in series. Accordingly, the fourth (P-th) group of the first type 18d of the third path 15c and the first group of the second type 19a of the fourth path 15d are connected in series. Connectors separately denoted by 33a-d and formed here as connectors of the first type 8 are provided for this purpose. Here, the connector 33a connects the second end shaped conductor 29c of the third path 15c and the first end shaped conductor 28d of the fourth path 15d in series. The connector 33b connects the second end shaped conductor 29a of the first path 15a and the first end shaped conductor 28b of the second path 15b in series.

The connector 33a, which connects the second end shaped conductor 29c of the third path 15c and the first end shaped conductor 28d of the fourth path 15d in series, implements an offset by q·N−1=5 slots 3. The connector 33b, which connects the second end shaped conductor 29a of the first path 15a and the first end shaped conductor 28b of the second path 15b in series, implements an offset by q·N+1=7 slots 3.

Figure 4:
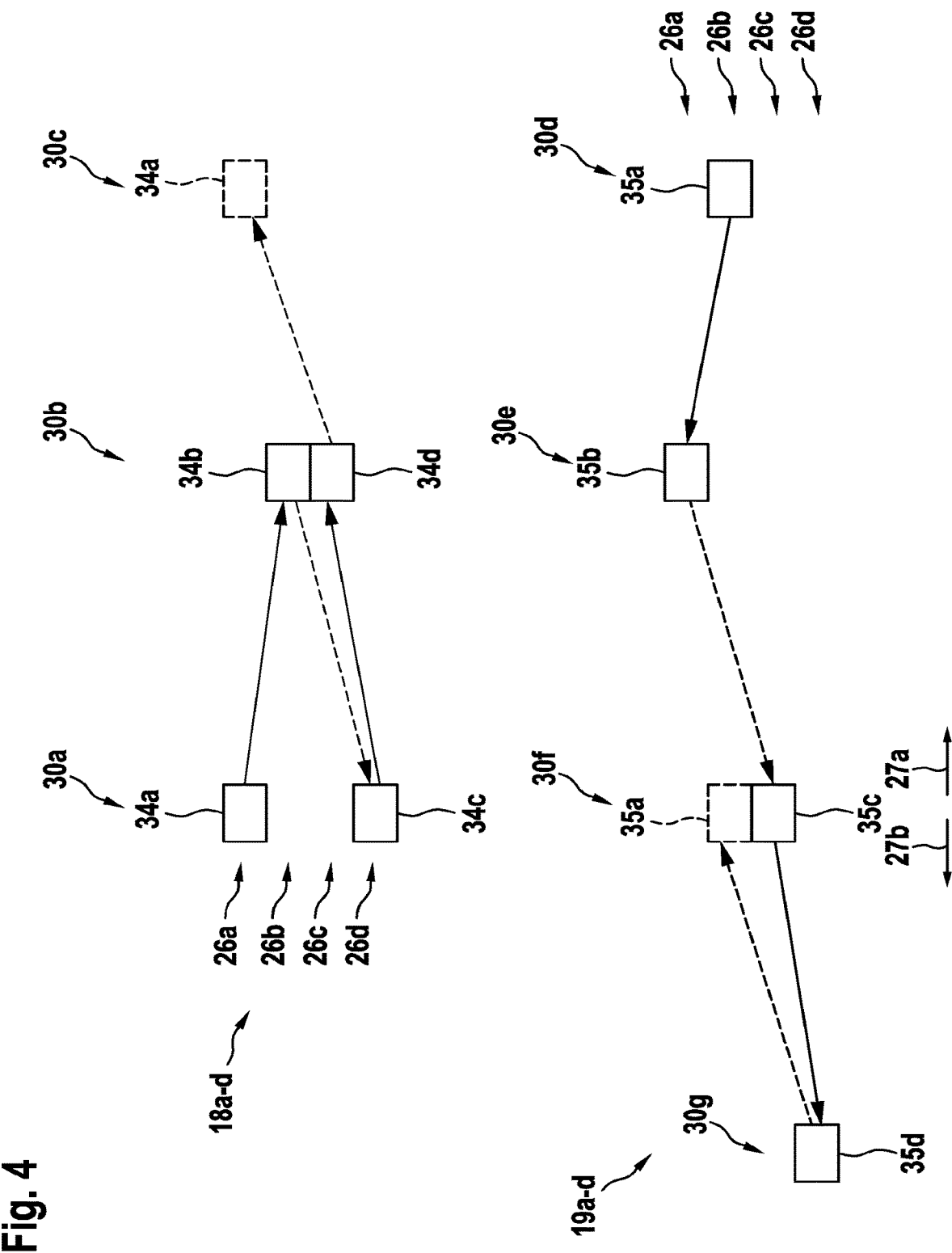
FIG. 4 shows an illustration of a detail of the groups of shaped conductors according to the first exemplary embodiment.

FIG. 4 is an illustration of a detail of the groups 18a-d, 19a-d of shaped conductors 4 according to the first exemplary embodiment.

The groups of the first type 18a-d comprise four successive shaped conductors 4, in terms of the series connection, which are separately denoted by 34a-d. Furthermore, in FIG. 4, three adjacent winding zones 30 are separately denoted by 30a-c. In the groups of the first type 18a-d, a first shaped conductor 34a is arranged in the first layer 26a of one of the winding zones 30a. A second shaped conductor 34b is arranged in the second layer 26b of a winding zone 30b adjacent, along the first circumferential direction 27a, to the winding zone 30a in which the first shaped conductor 34a is arranged. A third shaped conductor 34c is arranged in the fourth layer 26d of the winding zone 30a in which the first shaped conductor 34a is arranged. A fourth shaped conductor 34d is arranged in the third layer 26c of the winding zone 30b in which the second shaped conductor 34b is arranged. The first shaped conductor 34a of such groups of the first type 18b-d which directly follow a fourth shaped conductor 34d of another of the groups of the first type 18a-c in terms of the series connection is arranged in that winding zone 30c which follows, along the first circumferential direction 27a, the winding zone 30b in which the fourth shaped conductor 34d is arranged.

The groups of the second type 19a-d comprise four successive shaped conductors 4, in terms of the series connection, which are separately denoted by 35a-d. Furthermore, in FIG. 4, four adjacent winding zones 30 are separately denoted by 30d-g. In the groups of the second type 19a-d, a first shaped conductor 35a is arranged in the second layer 26b of one of the winding zones 30d. A second shaped conductor 35b is arranged in the first layer 26a of a winding zone 30e adjacent, along the second circumferential direction 27b, to the winding zone 30d in which the first shaped conductor 35a is arranged. A third shaped conductor 35c is arranged in the third layer 26c of a winding zone 30f adjacent, along the second circumferential direction 27b, to the winding zone 30e in which the second shaped conductor 35b is arranged. A fourth shaped conductor 35d is arranged in the fourth layer 26d of a winding zone 30g adjacent, along the second circumferential direction 27b, to the winding zone 30f in which the third shaped conductor 35c is arranged. The first shaped conductor 35a of such groups of the second type 19b-d which directly follow a fourth shaped conductor 35d of another of the groups of the second type 19a-c in terms of the series connection is arranged in that winding zone 30f in which the third shaped conductor 35c of the other of the groups of the second type 19a-c is arranged.

Figure 5:
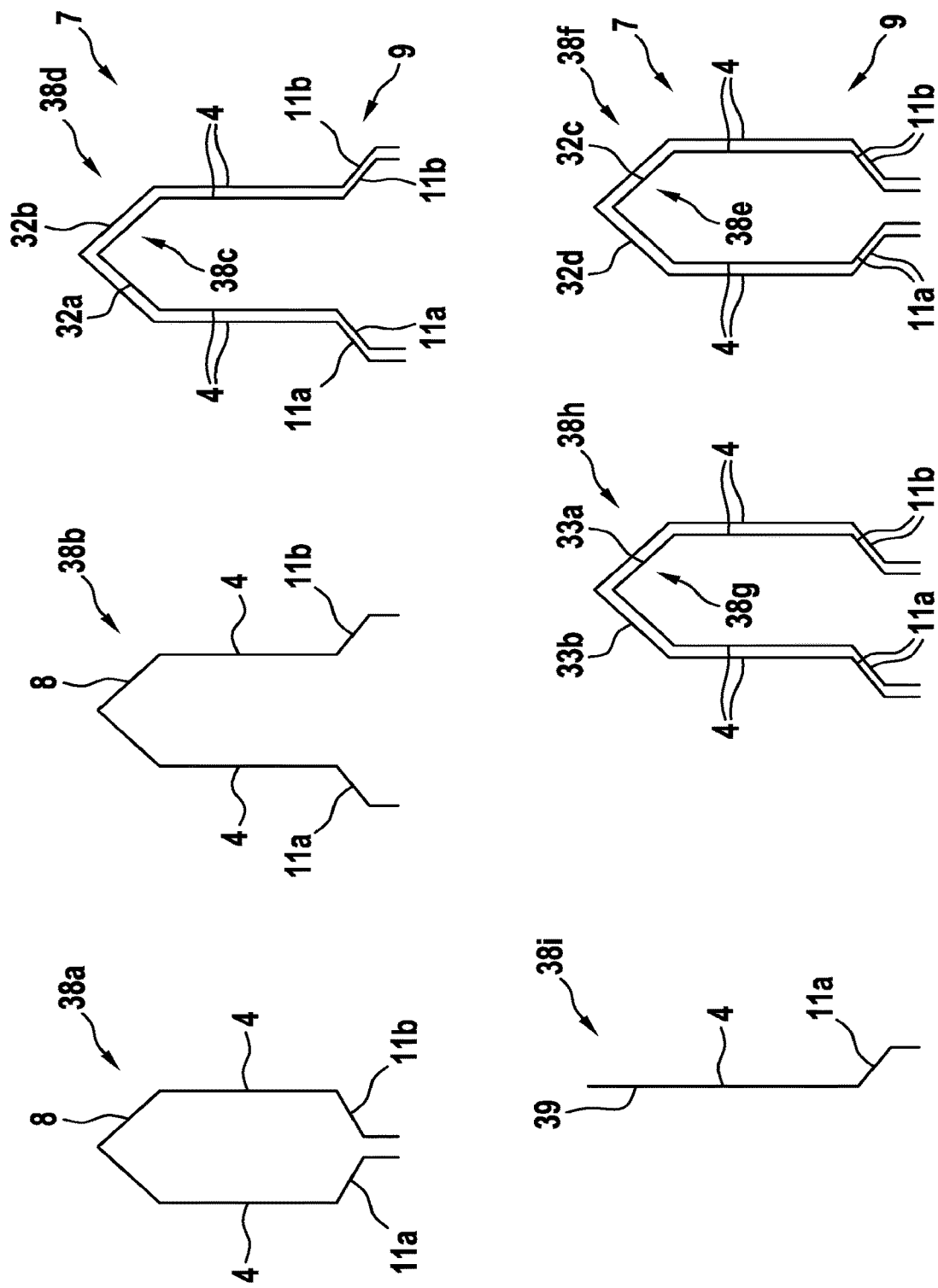
FIG. 5 shows a basic diagram of a plurality of conductor segments according to the first exemplary embodiment.

FIG. 5 is a basic diagram of a plurality of conductor segments 38a-i according to the first exemplary embodiment.

The conductor segments 38a-h are each formed from two shaped conductors 4, a connector of the first type 8, 32a-d, 33a, 33b which adjoins the second shaped conductors 4 at the first face 7 and connects them, and two connecting elements 11a, 11b which adjoin a respective one of the two shaped conductors 4 at the second face 9. Here, the conductor segments 38a-d are formed in one piece by way of example, but alternatively can also be formed by joining separate components. In each case two connecting elements 11a, 11b of different conductor segments 38a-i form a connector of the second type 10.

In the conductor segment 38a, the connecting elements 11a, 11b point towards each other in opposite circumferential directions 27a, 27b. The connected second and third shaped conductors 34a, 34b of a respective group of the first type 18a-d and the connected fourth and first shaped conductors 35d, 35a of different groups of the second type 19a-d are formed by conductor segments 38a.

In the conductor segment 38b, the conducting elements 11a, 11b point away from each other in opposite circumferential directions 27a, 27b. The connected fourth and first shaped conductors 34d, 34a of different groups of the first type 18a-d and the connected second and third shaped conductors 35b, 35c of a respective group of the second type 19a-d are formed by conductor segments 38b.

In the respective conductor segment 38c, 38d, the connecting elements 11a, 11b are oriented pointing away from each other in opposite circumferential directions 27a, 27b. Here, the connector of the first type 32a of the conductor segment 38c is arranged axially within the connector of the first type 32b of the conductor segment 38d. Therefore, the connector of the first type 32a is axially shorter than the connector of the first type 32b. Owing to the conductor segments 38c, 38d, the change 20 in the sub-winding zones 31a, 31b is formed in the first and third paths 15a, 15c.

In a respective conductor segment 38e, 38f, the connecting elements 11a, 11b are oriented in opposite circumferential directions 27a, 27b. Here, the connector of the first type 32c of the conductor segment 38e is arranged axially within the connector of the first type 32d of the conductor segment 38f. Therefore, the connector of the first type 32c is axially shorter than the connector of the first type 32d. Owing to the conductor segments 38e, 38f, the change 20 in the sub-winding zones 31a, 31b is formed in the second and fourth paths 15b, 15d.

In the respective conductor segment 38g, 38h, the connecting elements 11a, 11b are oriented in the second circumferential direction 27b. Here, the connector of the first type 33a of the conductor segment 38g is arranged axially within the connector of the first type 33b of the conductor segment 38h. Therefore, the connector of the first type 33h is axially shorter than the connector of the first type 33h. Owing to the conductor segment 38g, the third path 15c and the fourth path 15d are connected in series. Owing to the conductor segment 38h, the first path 15a and the second path 15b are connected in series.

The conductor segment 38i comprises a shaped conductor 4, a connecting element 11a adjoining the shaped conductor 4 at the second face 9 and a connection element 39 for making contact with the connection device 12 (see FIG. 1). The end shaped conductors 28a, 28c, 29b, 29d, which are not connected to another of the paths 15a-d, are formed by conductor segments 38i.

FIG. 5 schematically shows the conductor segments 38a-g, in particular without precise illustration of the number of slots 3 by which the connectors of the first type 8, 32a-d, 33a, 33b or the connecting elements 11a, 11b implement an offset. The conductor segments 38a-h can also be regarded as U-pins or hairpin conductors and the conductor segments 38i can be regarded as I-pins. The entire stator winding is then also referred to as a hairpin winding.

Figure 6:
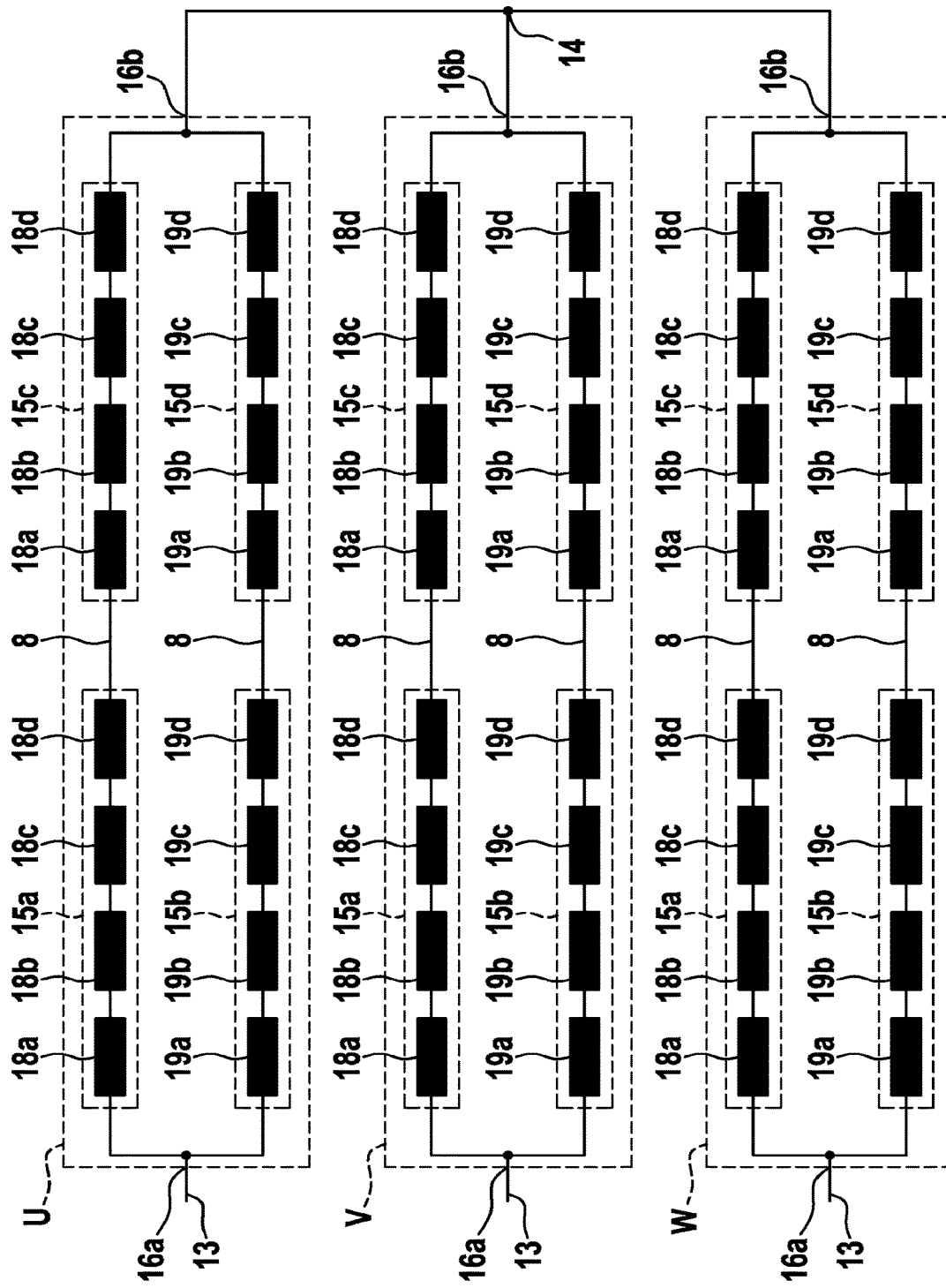
FIG. 6 shows a block circuit diagram of the stator winding of a second exemplary embodiment of the stator according to the invention.

FIG. 6 is a block circuit diagram of a stator winding according to a second exemplary embodiment of a stator 1. Provided nothing to the contrary is described hereinafter, all embodiments pertaining to the first exemplary embodiment can be applied to the second exemplary embodiment. Components that are the same or have the same effect are provided with identical reference signs here.

In the present exemplary embodiment, the first path 15a and the third path 15c are connected in series. Furthermore, the second path 15b and the fourth path 15d are connected in series.

Figure 7:
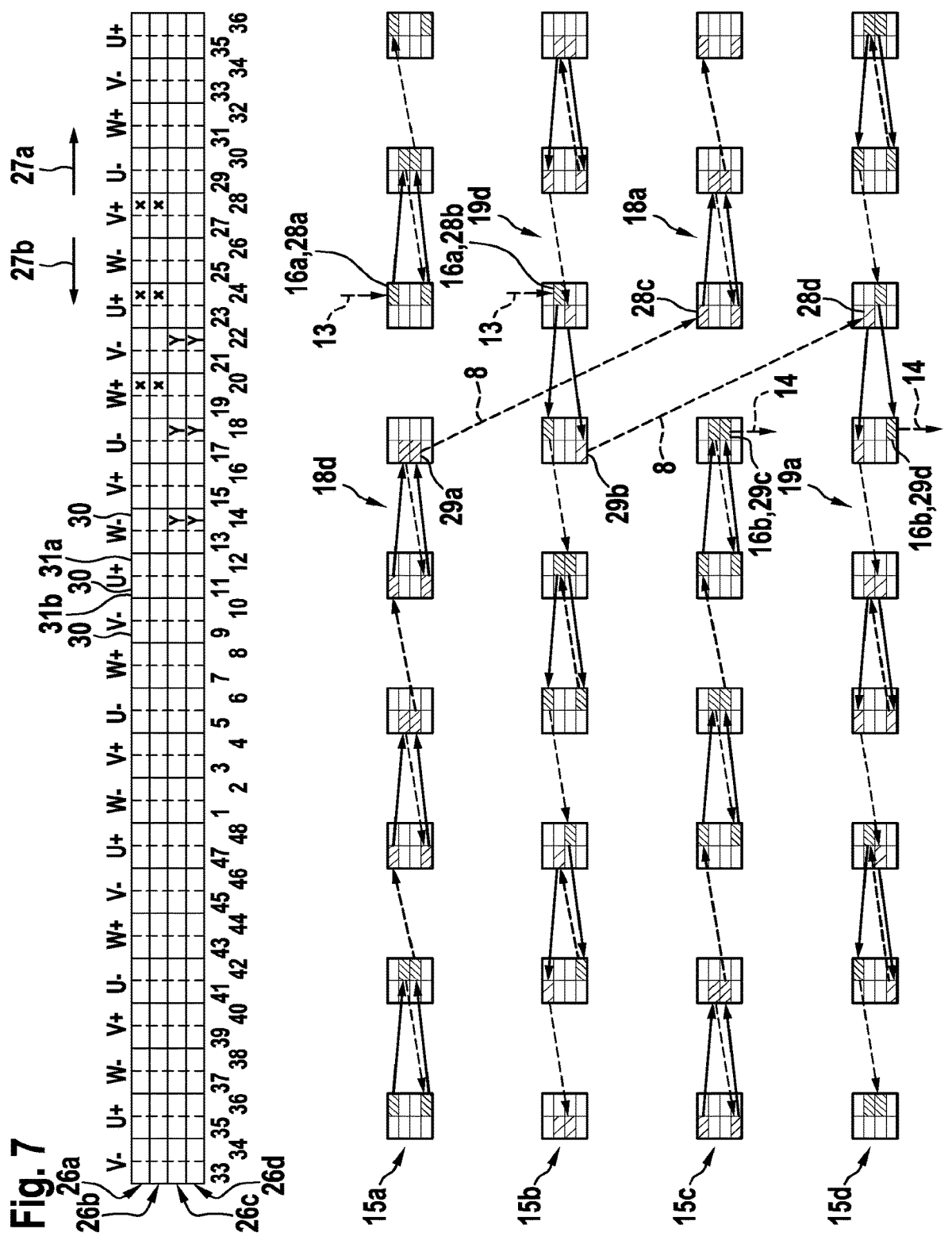

FIG. 7 is a winding diagram according to the second exemplary embodiment.

In the second exemplary embodiment, the second end shaped conductor 29a of the first path 15a and the first end shaped conductor 28c of the third path 15b are connected in series. Accordingly, the fourth (P-th) group of the first type 18d of the first path 15a and the first group of the first type 18a of the third path 15c are connected in series. Furthermore, the second end shaped conductor 29b of the second path 15b and the first end shaped conductor 28d of the fourth path 15d are connected in series. Accordingly, the fourth (P-th) group of the second type 19d of the first path 15b and the first group of the second type 19a of the fourth path 15d are connected in series.

In this case, a connector of the first type 8, formed by a conductor segment 38b (see FIG. 5), connects the second end shaped conductor 29a of the first path 15a and the first end shaped conductor 28c of the third path 15c in series. Furthermore, a connector of the first type 8, formed by a conductor segment 38a (see FIG. 5), connects the second end shaped conductor 29b of the second path 15b and the first end shaped conductor 28d of the fourth path 15d in series. The connectors of the first type 8 connecting the second and first end shaped conductors 29a, 28c, 29b, 28d of different paths 15a-d in series implement an offset by q·N=6 slots 3.

In the second exemplary embodiment, the conductor segments 38g, 38h arranged one in the other can therefore be dispensed with.

Figure 8:
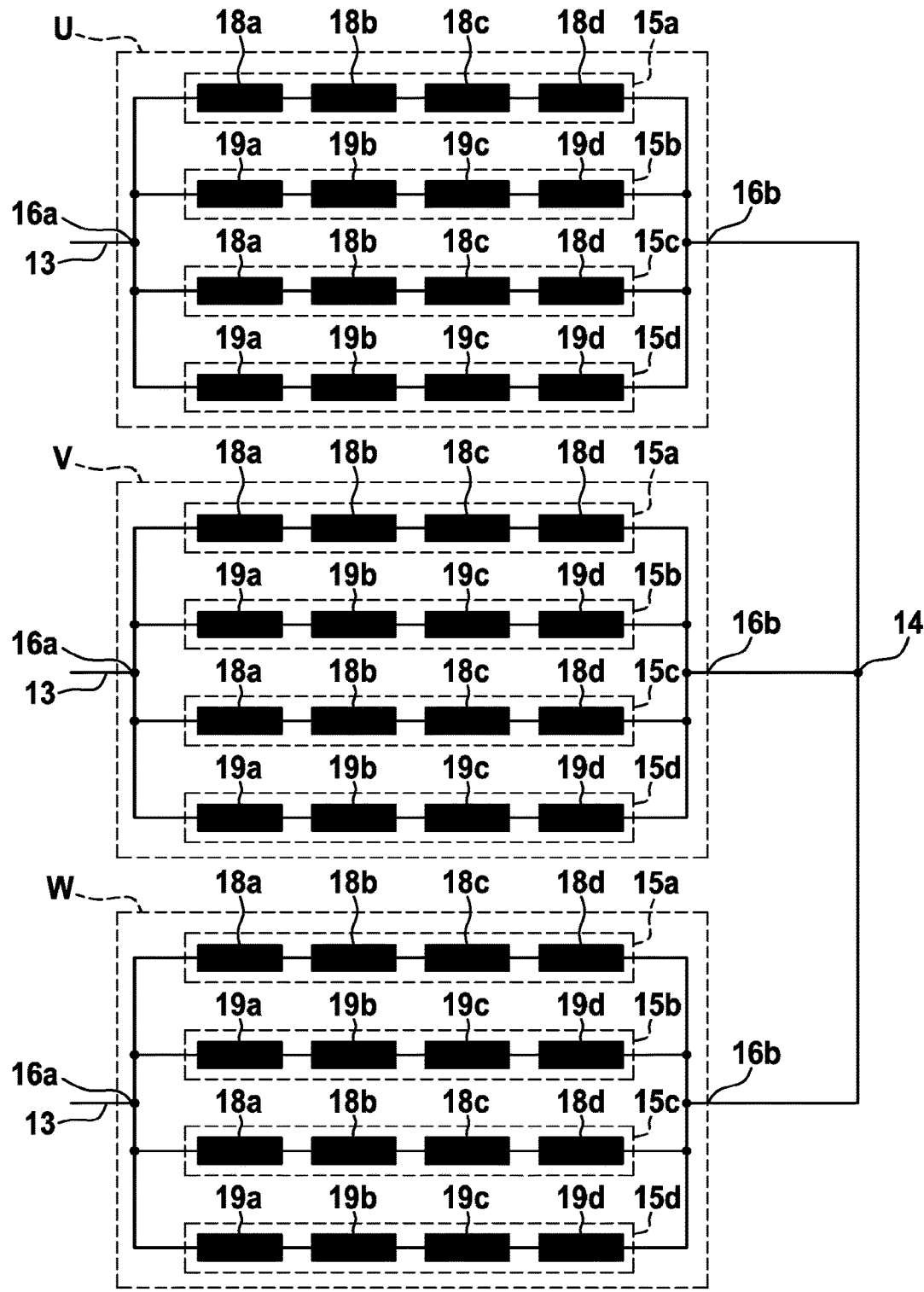
FIG. 8 shows a block circuit diagram of the stator winding of a third exemplary embodiment of the stator according to the invention.

FIG. 8 is a block circuit diagram of a stator winding according to a third exemplary embodiment of a stator 1. Provided nothing to the contrary is described hereinafter, all embodiments pertaining to the first exemplary embodiment can be applied to the third exemplary embodiment. Components that are the same or have the same effect are provided with identical reference signs here.

In the present exemplary embodiment, the first to fourth paths 15a-d of a respective phase U, V, W are connected in parallel. All the second end shaped conductors 29a-d are connected together here to form a single star point 14.

Figure 9:
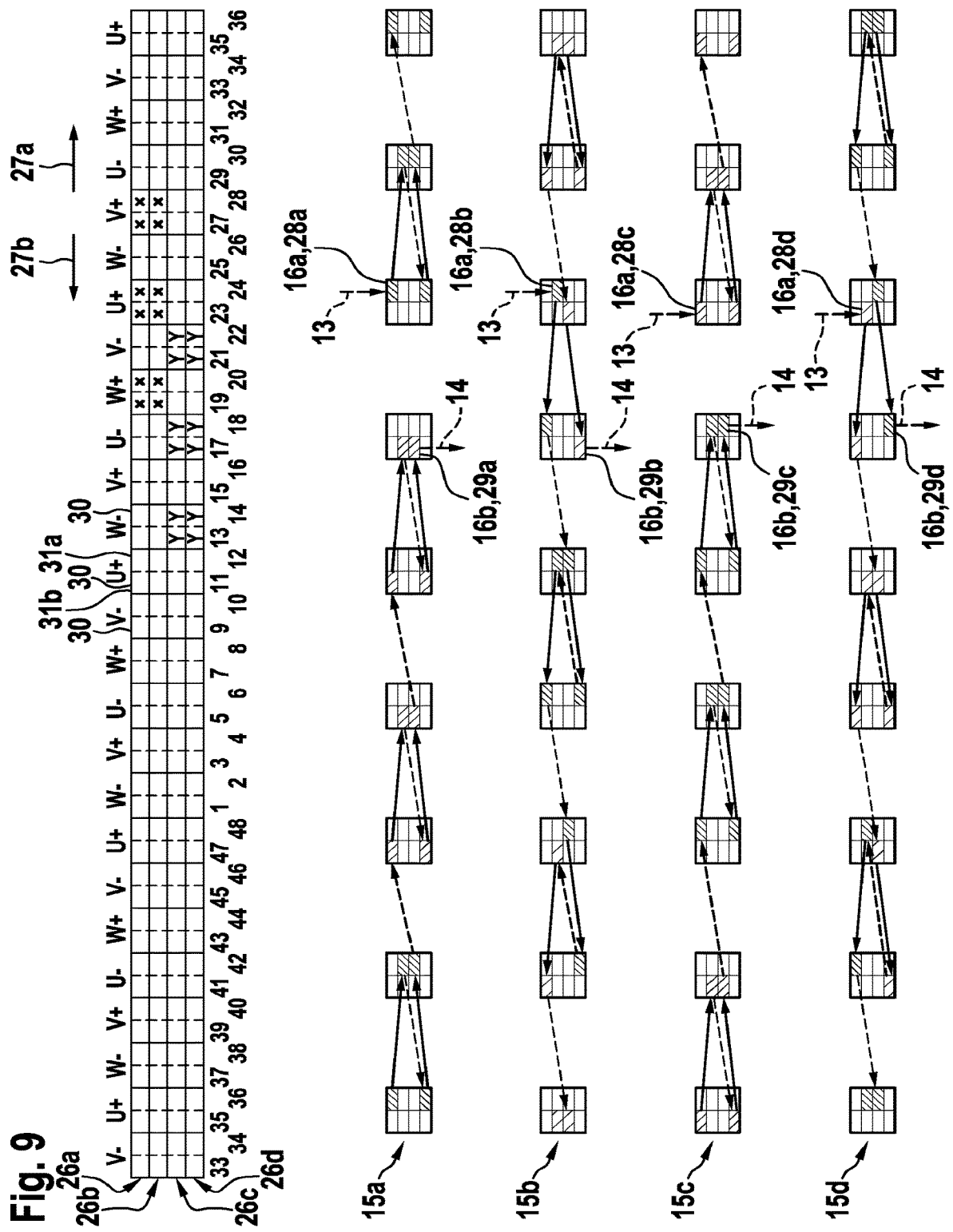
FIG. 9 shows a winding diagram according to the third exemplary embodiment.

FIG. 9 shows a winding diagram according to the third exemplary embodiment.

In the third exemplary embodiment, the first end shaped conductors 28a-d form the first end 16a and the second end shaped conductors 29a-d form the second end 16b of a respective phase U, V, W. Each end shaped conductor 28a-d, 29a-d is formed by a conductor segment 38i (see FIG. 5). The conductor segments 38g, 38h can be dispensed with.

The above-described exemplary embodiments result in the advantage that different winding diagrams, which form either a parallel connection of in each case two of the paths 15a-d or a parallel connection of all four paths 15a-d for each phase U, V, W, can be created with the same structure of the paths 15a-d. For this purpose, only the end shaped conductors 28a-d, 29a-d have to be correspondingly interconnected. Due to the change 20 in the sub-winding zones 31a, 31b, each path is of symmetrical construction, so that all the above-described exemplary embodiments likewise meet corresponding requirements in respect of symmetry.

Figure 10:
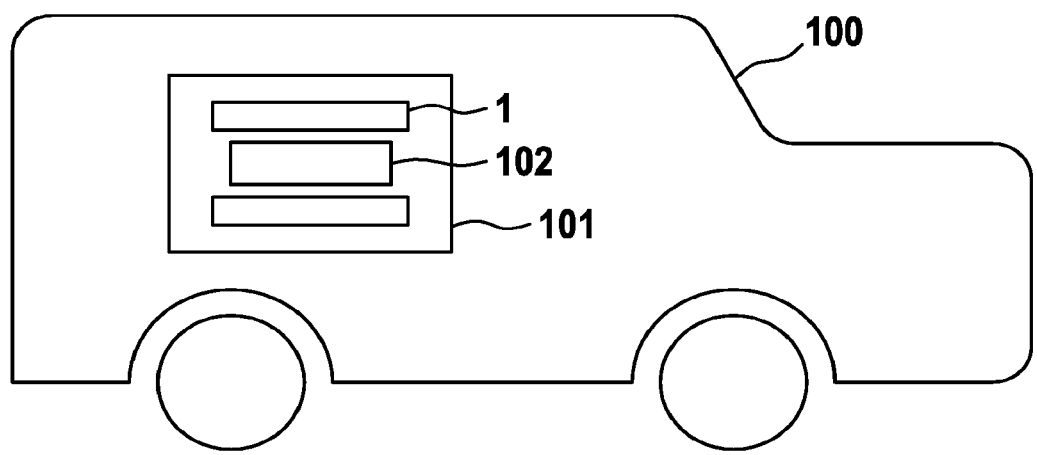
FIG. 10 shows a schematic diagram of a vehicle with an exemplary embodiment of the electric machine according to the invention.

FIG. 10 is a basic diagram of a vehicle 100 having an exemplary embodiment of an electric machine 101, for example a synchronous machine or an asynchronous machine/induction machine, which is in the form of an electric motor. The electric machine 101 comprises a stator 1 according to one of the above-described exemplary embodiments and a rotor 102, which is rotatably mounted within the stator 1. In the present exemplary embodiment, the rotor 102 is permanently excited, by way of example.

The invention claimed is:

1. Stator for an electric machine, wherein
the stator has a number N≥3 of phases, a number P≥2 of pole pairs and a hole count q=2, wherein
the stator comprises a stator core, which has a first face, a second face situated opposite the first face and a plurality of slots which extend from the first face to the second face and are divided into first to L-th layers, where L≥4, and a plurality of shaped conductors which are arranged in the slots in a radially layered manner in the first to L-th layer, wherein the layers are designated in their order in the radial direction, wherein
the shaped conductors form for each phase a first path, a second path, a third path and a fourth path and are arranged in 2·P winding zones, wherein
each winding zone is divided into a first and a second sub-winding zone, each sub-winding zone extends over the L layers and the sub-winding zones of a respective winding zone are designated in their order along a first circumferential direction and a second circumferential direction opposite to the first circumferential direction, wherein
the shaped conductors of a respective path are interconnected by connectors, which connect shaped conductors in adjacent winding zones of the same phase in an alternating manner at the first face and the second face of the stator core, to form a series connection with a first end shaped conductor, which is one of the outer shaped conductors, in terms of the series connection, of the path and with a second end shaped conductor, which is the other of the outer shaped conductors, in terms of the series connection, of the path, wherein
the end shaped conductors of each path are arranged in different sub-winding zones, so that the path exhibits a change in the sub-winding zones along the series connection.

2. Stator according to claim 1, wherein
the first path and the third path, extend from their first end shaped conductor to their second end shaped conductor along the first circumferential direction and the second path and the fourth path, extend from their first end shaped conductor to their second end shaped conductor along the second circumferential direction.

3. Stator according to claim 1, wherein
the first end shaped conductors of the first path and the second path, are located in the same sub-winding zone, which is different from the sub-winding zone in which the first end shaped conductors of the other two paths are located.

4. Stator according to claim 1, wherein
a respective phase has a first end and a second end, wherein the first end shaped conductor of the first path forms the first end of the phase and the second end shaped conductor of the fourth path forms the second end of the phase.

5. Stator according to claim 4, wherein
the first end shaped conductor of the third path forms the first end of the phase and the second end shaped conductor of the second path forms the second end of the phase and/or
the second end shaped conductor of the first path and the first end shaped conductor of the second path are electrically conductive connected by means of one of the connectors, so that the first path and the second path are connected in series, and/or
the second end shaped conductor of the third path and the first end shaped conductor of the fourth path are electrically conductive connected by means of one of the connectors, so that the third path and the fourth path are connected in series.

6. Stator according to claim 4, wherein
the first end shaped conductor of the second path forms the first end of the phase and the second end shaped conductor of the third path forms the second end of the phase and/or
the second end shaped conductor of the first path and the first end shaped conductor of the third path are electrically conductive connected by means of one of the connectors, so that the first path and the third path are connected in series, and/or
the second end shaped conductor of the second path and the first end shaped conductor of the fourth path are electrically conductive connected by means of one of the connectors, so that the second path and the fourth path are connected in series.

7. Stator according to claim 4, wherein
the first end shaped conductors of the paths form the first end of the phase and the second end shaped conductors of the paths form the second end of the phase.

8. Stator according to claim 4, further comprising
a connection device with phase connections which each contact the first end of one of the phases, and/or with a star point connector which connects the second ends of the phases to one or two star points.

9. Stator according to claim 1, wherein
the first path and the third path, each comprise at least two groups of the first to P-th groups of the first type designated in their order in terms of the series connection, of four successive shaped conductors, in terms of the series connection, which are designated in their order in terms of the series connection, wherein
a first shaped conductor of a respective one of the groups of the third type is arranged in the first layer of one of the winding zones,
a second shaped conductor of a respective one of the groups of the first type is arranged in the second layer of a winding zone adjacent, along one of the circumferential directions, to the winding zone in which the first shaped conductor is arranged,
a third shaped conductor of a respective one of the groups of the first type is arranged in the fourth layer of the winding zone in which the first shaped conductor is arranged, and
a fourth shaped conductor of a respective one of the groups of the first type is arranged in the third layer of the winding zone in which the second shaped conductor is arranged,
wherein the first shaped conductor of such groups of the first type which follow another group of the first type in terms of the series connection is arranged in one of the winding zones which follows, along one circumferential direction, the winding zone in which the fourth shaped conductor of the other group of the first type is arranged.

10. Stator according to claim 9, wherein
the (P/2)-th group of the first type and the [(P/2)+1-th] group of the first type, are electrically conductive connected by one of the connectors and the change in the sub-winding zones is performed by the connector.

11. Stator according to claim 9, wherein
the first end shaped conductor of a respective one of the two paths is the first shaped conductor of one of the groups of the first type and the second end shaped conductor of a respective one of the two paths is the fourth end shaped conductor of another of the groups of the first type.

12. Stator according to claim 1, wherein
the second path and the fourth path, each comprise at least two groups of the first to P-th groups of the second type designated in their order in terms of the series connection, of four successive shaped conductors, in terms of the series connection, which are designated in their order in terms of the series connection, wherein
a first shaped conductor of a respective one of the groups of the second type is arranged in the second layer of one of the winding zones,
a second shaped conductor of a respective one of the groups of the second type is arranged in the first layer of a winding zone adjacent, along one of the circumferential directions, to the winding zone in which the first shaped conductor is arranged,
a third shaped conductor of a respective one of the groups of the second type is arranged in the third layer of a winding zone adjacent, along one circumferential direction, to the winding zone in which the second shaped conductor is arranged, and
a fourth shaped conductor of a respective one of the groups of the second type is arranged in the fourth layer of a winding zone adjacent, along one circumferential direction, to the winding zone in which the third shaped conductor is arranged,
wherein the first shaped conductor of a group of the second type which follows another group of the second type in terms of the series connection is arranged in the winding zone in which the third shaped conductor of the other group of the second type is arranged.

13. Stator according to claim 12, wherein
the (P/2)-th group of the second type and the [(P/2)+1-th] group of the second type, are electrically conductive connected by one of the connectors and the change in the sub-winding zones is performed by the connector.

14. Stator according to claim 12, wherein
the first end shaped conductor of a respective one of the two paths is the first shaped conductor of one of the groups of the second type and the second end shaped conductor of a respective one of the two paths is the fourth end shaped conductor of another of the groups of the second type.

15. Electric machine for driving a vehicle, comprising a stator according to claim 1 and a rotor rotatably mounted within the stator.

16. Stator according to claim 2, wherein
the first end shaped conductors of the first path and the second path are located in the same sub-winding zone, which is different from the sub-winding zone in which the first end shaped conductors of the other two paths are located.

17. Stator according to claim 2, wherein
a respective phase has a first end and a second end, wherein the first end shaped conductor of the first path forms the first end of the phase and the second end shaped conductor of the fourth path forms the second end of the phase.

18. Stator according to claim 5, further comprising
a connection device with phase connections which each contact the first end of one of the phases, and/or with a star point connector which connects the second ends of the phases to one or two star points.

19. Stator according to claim 2, wherein
the first path and the third path, each comprise at least two groups of the first to P-th groups of the first type designated in their order in terms of the series connection, of four successive shaped conductors, in terms of the series connection, which are designated in their order in terms of the series connection, wherein
a first shaped conductor of a respective one of the groups of the third type is arranged in the first layer of one of the winding zones,
a second shaped conductor of a respective one of the groups of the first type is arranged in the second layer of a winding zone adjacent, along one of the circumferential directions, to the winding zone in which the first shaped conductor is arranged,
a third shaped conductor of a respective one of the groups of the first type is arranged in the fourth layer of the winding zone in which the first shaped conductor is arranged, and
a fourth shaped conductor of a respective one of the groups of the first type is arranged in the third layer of the winding zone in which the second shaped conductor is arranged,
wherein the first shaped conductor of such groups of the first type which follow another group of the first type in terms of the series connection is arranged in one of the winding zones which follows, along one circumferential direction, the winding zone in which the fourth shaped conductor of the other group of the first type is arranged.

20. Stator according to claim 10, wherein
the first end shaped conductor of a respective one of the two paths is the first shaped conductor of one of the groups of the first type and the second end shaped conductor of a respective one of the two paths is the fourth end shaped conductor of another of the groups of the first type.

* * * * *